Aug. 8, 1961 R. B. LAWRANCE ET AL 2,994,903

TAPE TRANSPORT LOOP CHAMBER APPARATUS

Filed Feb. 6, 1958

INVENTORS
RICHARD B. LAWRANCE
ROBERT M. BOEHME
BY Henry L. Hanson
ATTORNEY 2,994,903
Patented Aug. 8, 1961

2,994,903
TAPE TRANSPORT LOOP CHAMBER APPARATUS

Richard B. Lawrance, Winchester, and Robert M. Boehme, Cambridge, Mass., assignors to Minneapolis-Honeywell Regulator Company, Minneapolis, Minn., a corporation of Delaware Filed Feb. 6, 1958, Ser. No. 713,629
7 Claims. (Cl. 15—308)

A general object of the present invention is to provide a new and improved apparatus for the handling of a flat flexible tape. More specifically, the present invention is concerned with an apparatus for use with a flat, flexible tape, which apparatus is characterized by its ability to function to maintain a loop in a flexible tape, to clean the tape as it is being processed and to exert a minimum loading and wearing effect on the tape as it passes through the apparatus.

Flat flexible tapes are widely used in numerous types of apparatus for conveying or storing information. Such tapes may be paper tapes, magnetic tapes, and the like. In many types of apparatus using tapes for data processing purposes, there is a continual problem of dirt, dust, lint and the like causing contamination of the tapes which reduces their usefulness. Generally, such data handling or record handling tapes co-operate with some type of a data transfer mechanism over which or against which the tape must pass in the course of transferring data to and from the tape. In the case of a magnetic tape, the tape is passed under a magnetic recording and/or reading head which is used to transfer magnetic flux variations to and from the tape. The spacing of the magnetic data transfer head from the tape is very critical particularly when the information on the tape is very densely packed. This renders the system particularly sensitive to the presence of any dust or lint or other types of surface contamination which may cause a displacement of the tape from the recording head. The presence of dust or other materials between the recording head and the tape may cause complete loss of a portion of the signal to be recorded or a weakening thereof sufficient to render the resultant recording useless. Further, when such a tape is being read, the presence of dust over information which has been properly recorded may result in the information not being read properly from the tape.

While extreme precautions are exercised in the manufacture of magnetic tape and the placing of the same on the appropriate mechanical apparatus for the use in a data handling mechanism, it is substantially impossible to eliminate completely both the generation of dust within the mechanism itself and the introduction of some dust from outside sources, such as from the clothes worn by the operator using the apparatus or from the atmosphere. In the case of digital recording, the loss of a single pulse on a complete magnetic tape can result in considerable inconvenience to an operator and can further result in considerable loss of time in the using of such a tape. If there is a loss of information, the operator may be required to go back and start at the beginning of a particular program or problem in order to get the magnetic tape back in a condition in which it can be used at a subsequent time.

In accordance with the principles of the present invention, means are provided whereby it is possible to perform a cleaning operation on the magnetic tape without impairing the operational characteristics of the tape. In addition to this cleaning operation, the apparatus will also function to produce a loop of tape as required for use with the mechanism.

It is accordingly a more specific object of the present invention to provide a new and improved apparatus for removing dust and other unwanted materials from the surface of a record tape.

A stilll further more specific object of the present invention is to provide a new and improved cleaning apparatus for a record tape which operates in co-operation with a loop or slack chamber for a record tape.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figures 1, 2, 3:
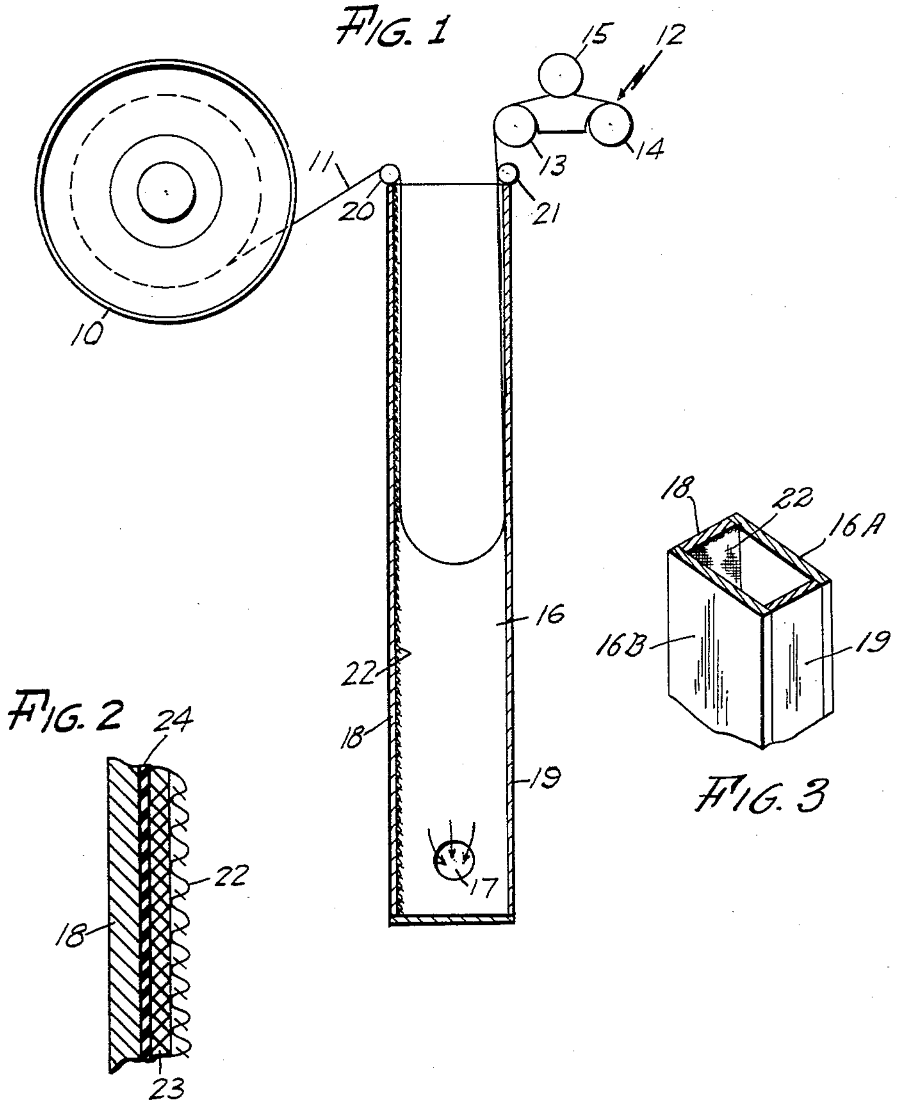
FIGURE 1 is a diagrammatic showing of a portion of a magnetic tape transport mechanism which incorporates the principles of the present invention.
FIGURE 2 is an exploded sectional view of a portion of the loop chamber illustrated in FIGURE 1.
FIGURE 3 is a cross-sectional view of the loop chamber.

Referring first to FIGURE 1, the numeral 10 illustrates a reel on which a magnetic tape is adapted to be stored and supplied therefrom. The tape may be used for storing data transferred to or read therefrom by way of a data transfer mechanism 12. This latter data transfer mechanism may comprise a pair of contra-rotating pneumatic capstan elements 13 and 14 which are arranged to move the tape 11 past a data transfer head 15, the latter being arranged to transfer magnetic signals to and from the tape 11 as the tape is moved past the head 15 by one or the other of the capstans 13 and 14. Positioned between the data transfer means 12 and the reel 10 is a loop chamber 16. This loop chamber is arranged to provide a certain amount of slack in the tape 11 between the reel 10 and the data transfer means 12 so that the tape may be utilized by the data transfer means without interference from the operation of the reel 10. In other words, the loop chamber is an isolating means between data transfer means 12, which may be operating in a rapid manner with a series of starts and stops in the millisecond range, and the reel 10, the latter operating slowly by comparison even though the net tape speed is the same. The tape is pulled into the chamber to form a loop by suitable pneumatic means, such as a suction pump which may be connected to the port 17 at the lower end of the chamber 16. The presence of a subatmospheric pressure below the tape 11 within the chamber 16 will cause the atmospheric pressure above the tape to force the tape down into the chamber. By suitable depth sensing means, not shown, the tape loop length within the chamber may be controlled to maintain the loop length within predetermined limits in the chamber 16. For example, this may be effected by photoelectric means or pneumatic depth sensing means controlling a motor driving the reel 10 in a forward or reverse direction.

The sides of the loop chamber 16 may be formed of elongated members 18 and 19, the width of said members being slightly greater than the width of the tape 11 being passed therethrough. The tape 11 is shown to be slightly displaced from the upper edge of the members 18 and 19 by a pair of guide members 20 and 21. In addition, the tape 11 is shown to be slightly displaced from the solid portion of the wall member 18 by a suitable fabric which has been formed on the side of the wall. It will be apparent that the wall 19 may also have a fabric thereon. This fabric 22 is adapted to cover at least that portion of the chamber wall wherein the loop is normally present. The exploded view of this wall section 18 is shown in FIGURE 2. Here, it will be seen that the fabric 22 is formed on a suitable backing material 23 and is then fastened to the wall 18 by a suitable rubberized cement 24. The fabric selected in one embodiment of the invention was a nylon-loop twist or nylon-bouclé fabric which was substantially lint free.

FIGURE 3 shows a sectional view of the loop chamber with chamber enclosing end plates 16A and 16B in position.

In operation, the tape 11 will be either feeding off of or onto the reel 10 through the loop chamber 16. Consequently, the tape will be continuously passing over the fabric 22 which will tend to wipe the dust and other material which may have collected on the tape. Normally, although not necessarily, the fabric 22 will be wiping or cleaning the supporting side of the tape, in the case of a magnetic tape. This supporting side will, in the process of being wound up on the reel, be adjacent to the recording side of the next layer of tape which is wound on the reel. Consequently, great care must be exercised to see that no dust is on this supporting side so that it could be transferred to the recording side of the tape as it is wound upon the reel 10.

If the tape is a magnetic tape and is passed through the loop chamber with the recording side adjacent the fabric, the same cleaning advantages will ensue as the fabric will wipe the active side of the tape.

While the fabric 22 by itself serves as a cleaning means for this supporting side of the tape, the presence of a subatmospheric pressure creates an air flow through the loop chamber which has the effect of cleaning the fabric 22 and causing the fabric and the air to function as a vacuum cleaning system for the tape. This vacuum cleaning action will be enhanced somewhat by the fact that the tape loop within the chamber 60 will be continually varying in its depth within the chamber so that various portions of the fabric will be subjected to varying amounts of air flow about the tape. This will mean that no one portion of the fabric 22 will be functioning as a cleaning means while other portions are not used. Further, the air flow tends to clean the fabric as the air passes in back of the tape. This is due to the fact that the tape will not form a tight seal with the fabric at the points of engagement of the two and the motion of the tape, whether caused by the rapid movement from the capstan or the slower movement from the reel, will agitate the surface fibers of the fabric and with the air passing behind the tape, the lint and other particles will be shaken free of the fabric.

It will also be apparent that with such fabric acting on the tape that the tape 11 will be engaging the surface of the wall 18 only at restricted points. This will minimize the friction between the tape and the wall and minimize the electrostatic forces that tend to build up between the tape and the wall.

Another advantage gained by the use of the present apparatus is the acoustic dampening effect provided by the presence of the fabric on the walls of the loop chamber. This will be apparent when it is noted that under certain modes of operation the capstans may be causing successive rapid starts and stops of the tape whereby the rapidly accelerating lower portions of the tape loop within the chamber excites successive travelling pressure waves in the air within the upper and lower portions of the chamber. If these vibrations are allowed to persist, or to excite resonant conditions within the chamber, there are created unwanted forces acting on the tape which may be reflected back to adversely affect the operation of the data transfer means 12. The presence of the fabric tends to absorb these acoustic air vibrations and to stabilize the motion of the tape in the vicinity of the data transfer head 15. It will be apparent that the selection of an acoustic material may be along the lines of the pile fabric illustrated or along lines to provide a material of greater acoustic absorbing ability.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. A magnetic tape passageway comprising a pair of adjacent rectangular members adapted to engage the outer sides of a loop of magnetic tape, said members forming a chamber in which the loop of tape is free to move in its relative position therein, one of said members having a substantially frictionless fabric of an air pervious material and formed on the tape engaging surface thereof, chamber enclosing means fastened to the edges of said pair of members, and an air suction source coupled to said chamber below the loop thereof to hold said loop in said chamber and create an airflow between the tape and the fabric.

2. A loop chamber for a movable tape comprising a pair of rectangular plates forming opposite sides of said chamber and between which a loop of tape is free to move, chamber enclosing means fastened to the edges of said plates, a suction source connected to one end of said chamber opposite the end where the tape enters the chamber, and means formed on at least one side of said chamber to hold the tape displaced from the main body of said one side and contacting said tape at a plurality of points, said means comprising a substantially frictionless fabric having the surface thereof open sufficiently to pass air along the surface thereof under the tape.

3. A flat tape loop chamber comprising a pair of elongated rectangular members displaced from each other so that a loop of tape may be confined thereby and free to move along the length thereof, chamber enclosing means fastened to said rectangular members, a substantially frictionless fabric formed on the tape engaging side of one of said members, said fabric being fastened on said member, and a pneumatic means connected to said chamber to create a flow of air therethrough and to provide a biasing force on said loop to maintain said loop within said chamber.

4. A loop chamber for a magnetic tape comprising a pair of elongated rectangular plates forming the opposite sides of said chamber, side plates attached to said rectangular plates to form an elongated enclosure having a rectangular cross section, a pneumatic suction source connected to one end of said chamber, an opening at the other end of said chamber through which said tape may pass to form a loop which is free to move along the length of said chamber, and means formed on at least one side of said chamber to hold the tape displaced from the main body of said one side and contacting said tape at a plurality of points, said means comprising a fabric whose surface fibers project against said tape to create an air space between said side and said tape so that said pneumatic suction source will create an air flow to clean that portion of the magnetic tape which comes in contact therewith.

5. A loop chamber for a movable magnetic tape having a support side and a recording side comprising a pair of rectangular plates forming the opposite sides of said chamber, a suction source connected to one end of said chamber opposite the end at which the tape enters said chamber, a tape opening at the other end of said chamber through which the tape may pass to form a loop, means formed on at least one side of said chamber to engage said tape on its support side to hold the tape displaced from the main bdoy of said one side and contacting said support side at a plurality of points, said means comprising a fabric, and means including said suction source connected to said loop chamber to create an air flow through said chamber to remove unwanted material from said chamber and to retain a biasing force on the tape loop in said chamber.

6. A loop chamber for an elongated flexible tape comprising a pair of rectangular side plates positioned adjacent each other and a pair of chamber enclosing members engaging said side plates to form an elongated chamber within which a loop of tape will be free to move along the length thereof, pneumatic means coupled to said chamber to exert a pressure differential on said loop tending to maintain said loop within said chamber, and an acoustic absorption means coupled to at least one wall of said chamber to damp out unwanted vibrations, said absorption means being substantially frictionless with respect to said tape.

7. A loop chamber as defined in claim 6 wherein said acoustic absorption means is a fabric fastened to at least one of said side plates and positioned to engage the tape extending into said elongated chamber.

References Cited in the file of this patent

UNITED STATES PATENTS

| | | |
|---|---|---|
| 1,237,047 | Howell | Aug. 14, 1917 |
| 1,389,082 | Teitel | Aug. 30, 1921 |
| 1,390,076 | Bennett | Sept. 6, 1921 |
| 2,242,144 | Runton | May 13, 1941 |
| 2,288,983 | Weiss | July 7, 1942 |
| 2,300,266 | Smellie | Oct. 27, 1942 |
| 2,468,198 | Heller | Apr. 26, 1949 |
| 2,778,634 | Gams et al. | Jan. 22, 1957 |
| 2,792,217 | Weidenhammer et al. | May 14, 1957 |
| 2,818,595 | Rosewall | Jan. 7, 1958 |